United States Patent [19]

Baermann

[11] 3,862,515

[45] Jan. 28, 1975

[54] PERMANENT MAGNET SEALING AND CLOSURE MEMBER

[76] Inventor: Max Baermann, 506 Bensberg, Bezirk-Cologne, Germany

[22] Filed: May 15, 1973

[21] Appl. No.: 360,581

[30] Foreign Application Priority Data
Mar. 13, 1973  Germany............................ 2312291

[52] U.S. Cl.................... 49/478, 49/485, 49/490, 49/495, 49/499
[51] Int. Cl............................................. E06b 7/23
[58] Field of Search ............ 49/478, 485, 479, 475, 49/495, 499, 490, 484

[56] References Cited
UNITED STATES PATENTS

| | | | |
|---|---|---|---|
| 2,190,954 | 2/1940 | Stickel | 49/495 X |
| 2,607,091 | 8/1952 | Dodge | 49/490 x |
| 2,794,221 | 6/1957 | Bedics | 49/479 |
| 3,217,921 | 11/1965 | Frehse | 49/479 X |
| 3,241,198 | 3/1966 | Baermann | 49/478 |
| 3,287,856 | 11/1966 | Passovoy | 49/495 X |

*Primary Examiner*—Philip C. Kannan

[57] ABSTRACT

A permanent magnet sealing and closure member comprises an elongated thin flexible strip of permanent magnet material having a strip longitudinal axis. The strip includes at least one sealing and closure strip portion having a substantially plane outer surface and an opposite inner surface. A plurality of legs extend outwardly from the inner surface of the sealing and closure strip portion. The legs are spaced-apart in a direction transversely of the longitudinal axis and substantially parallel to the outer surface. The sealing and closure strip portion is magnetized to have magnetic poles of alternating polarity extending along the outer surface thereof. The magnetic lines of force extend between adjacent ones of the alternate magnetic poles within the strip and legs over an arcuate path.

13 Claims, 7 Drawing Figures

PERMANENT MAGNET SEALING AND CLOSURE MEMBER

BACKGROUND OF THE INVENTION

This application pertains to the art of sealing and closure device, and more particularly to permanent magnet sealing and closure devices. The sealing and closure member is particularly applicable for use on panels which are swingable relative to an opening for selectively closing the opening and will be particularly described with reference thereto. However, it will be appreciated that the invention has broader applications and may be used for other sealing and closure purposes.

It is common to swingably mount closure panels along one edge of an opening for selectively closing the opening or allowing access therethrough. Such closure panels may be in the form of doors on doorways, closets, boxes and refrigerators. Such closure panels may also be in the form of windows, lids and the like.

In arrangements of the type described, the closure panel has an inner peripheral surface facing a peripheral surface around the opening. It is common to attach a flexible gasket to one of the surfaces and provide a material having a high magnetic permeability on the other surface. The flexible gasket contains flexible permanent magnet strips. When the closure panel is closed, the permanent magnet strips attach to the member having a high magnetic permeability by magnetic attractive forces. The flexible gasket is firmly attached to the member having a high magnetic permeability to provide a good seal between the closure panel and opening. In addition, such an arrangement provides a magnetic latch which requires no additional mechanical latches or fasteners to keep the closure panel in its closed position.

Permanent magnet sealing and closure members of known types do not have high flexibility in a direction perpendicular to the closing surfaces. Therefore, it is common to mount the flexible permanent magnet sealing and closure strip on a non-magnetic highly resilient sealing strip in order to compensate for irregularities in the closing surfaces. The use of an additional highly resilient sealing and mounting strip requires additional costs for material and assembly. Arrangements of this type are described in U.S. Pat. No. 2,958,912; German Offenlegungsschrift publication No. 15 53 539; and German Pat. specification Nos. 1,157,109 and 1,286,933.

It has become common practice to dispense with the use of highly resilient non-magnetic mounting and sealing strips for the permanent magnet strip by directly attaching one side of the flexible permanent magnet strip onto one of the closing surfaces. Due to its flexible properties, the permanent magnet strip will attach itself to the other closing surface which has a soft iron frame or the like secured thereto.

In order to obtain a high flexibility of the permanent magnet strip generally perpendicular to the closing surfaces, the strip has to be formed as a very thin tape. This is because the permanent magnet material itself is not highly flexible, and flexibility is provided by making the permanent magnet strip with very thin dimensions. In order to achieve good flexibility in a direction perpendicular to the closing surfaces, prior art strips of the type described had to be formed with relatively broad dimensions. That is, as a rather broad or wide tape.

Permanent magnet strips of the type described are usually provided with magnetic poles of alternating polarity along one edge surface thereof. The lines of magnetic force must pass through the strip between adjacent opposite magnetic poles. With extremely thin strips, the magnetic lines of force cannot arcuately curve very great distances through the strip. The thinner the permanent magnet strip, the smaller the pole width has to be made. Therefore, the pole width is dependent upon the thickness of the permanent magnet strip. With optimum utilization of the available area of the permanent magnet material in the strip, the pole width can usually be no greater than twice the thickness of the strip.

In order to obtain better sealing and higher closing forces, magnetic strips of the type described have been secured on both of the closing surfaces. The opposed permanent magnet strips are positioned with poles of opposite polarity facing one another so that the two strips magnetically attach themselves together. Even though permanent magnet strips of the type described are very thin, their low attractive force requires the use of a relatively high amount of flexible permanent magnet material. An arrangement of this type is described in German Pat. specification No. 1,236,969.

SUMMARY OF THE INVENTION

A flexible permanent magnet sealing and closure member of the type described comprises an elongated thin flexible strip of permanent magnet material having a strip longitudinal axis. The strip includes at least one sealing and closure strip portion having a substantially plane outer surface and an inner surface.

In accordance with a preferred arrangement, a plurality of legs extend outwardly from the inner surface of the sealing and closure strip portion. The legs are spaced-apart in a direction transversely of the longitudinal axis, and substantially parallel to the outer surface of the sealing and closure strip portion. The sealing and closure strip portion is magnetized to have magnetic poles of alternating polarity extending along the outer surface thereof. Magnetic lines of force extending within the strip between adjacent opposite magnetic poles take arcuate courses within the legs.

In accordance with a preferred arrangement, there are a plurality of sealing and closure strip portions which are spaced-apart across a gap in a direction extending transversely to the longitudinal axis and substantially parallel to the outer surfaces. Certain of the legs face one another across the gap and are integrally connected together by a web spaced substantially below the sealing and closure strip portions. The closure and sealing strip portions are preferably spaced outwardly from the mounting edge portion outer surface.

In accordance with another aspect of the invention, the permanent magnet strip includes at least one mounting edge portion having mounting edge portion outer and inner surfaces. A plurality of legs extend outwardly from the inner surface of the mounting edge portion. The mounting legs are spaced-apart in a direction transversely to the longitudinal axis of the strip and substantially parallel to the mounting edge portion outer surface. An elongated flange on a member to which the permanent magnet strip is to be mounted is tightly received between the mounting legs for mounting the permanent magnet strip on the member.

It is a principal object of the present invention to provide a permanent magnet sealing and closure member which does not require additional highly resilient and non-magnetic sealing strips.

It is an additional object of the present invention to provide a permanent magnet sealing and closure member with highly flexible properties perpendicular to a pair of parallel closing surfaces, and transverse to the longitudinal axis of the strip.

It is a further object of the present invention to provide a flexible permanent magnet closure and sealing member with an integral mounting thereon for mounting the strip to another member.

It is a further object of the present invention to provide an improved flexible permanent magnet sealing and closure member which provides better sealing and stronger closing forces.

It is also an object of the present invention to provide a flexible permanent magnet closure and sealing member which can easily be joined together at corner joints.

BRIEF DESCRIPTION OF THE DRAWINGS

The invention may take form in certain parts and arrangements of parts, preferred embodiments of which will be described in detail in this specification and illustrated in the accompanying drawing which forms a part hereof.

DESCRIPTION OF THE PREFERRED EMBODIMENTS

Figure 1:
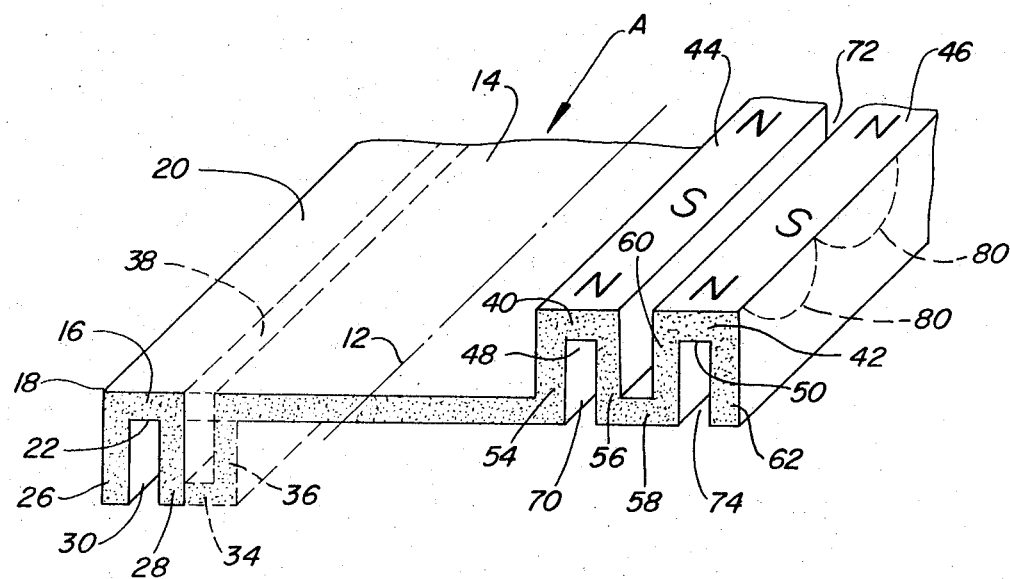
FIG. 1 is a perspective illustration of an improved permanent magnet sealing and closure member constructed in accordance with the present invention.

Referring now to the drawing, wherein the showings are for purposes of illustrating certain preferred embodiments of the invention only and not for purposes of limiting same, FIG. 1 shows a magnetic sealing and closure member constructed in accordance with the present invention. The magnetic sealing and closure member comprises an elongated thin flexible strip A of permanent magnet material having a strip longitudinal axis generally indicated by numeral 12.

Strip A is extruded or otherwise molded from a rubber-like flexible binding agent mixed with a powdered isotropic or anisotropic permanent magnet material. Many different types of flexible binding agents can be used, such as plasticized polyvinyl chloride, sulpho-chlorinated polyethylene or a polyisobutylene. The flexible binding agent may also be formed from a mixture of such thermoplastic materials or other similar materials. The powdered isotropic or anisotropic permanent magnet material may be barium-ferrite, strontium-ferrite or lead-ferrite.

With a permanent magnet strip formed in accordance with the present invention, it is possible to achieve very good flexible properties with a high filling factor of powdered permanent magnet material. For example, the powdered permanent magnet material may equal 95–97 percent by weight of the strip. Therefore, very little plastic binder is required. The attractive force of the strip becomes better with an increasing filling factor of powdered permanent magnet material. This makes a very high filling factor of powdered permanent magnet material especially important. This high filling factor is desirable in order to obtain a high attractive force. In addition, the thickness of the available magnet material in the thin strip during magnetization is also important for maximizing the bar length, or the length over which the lines of magnetic force may pass through the strip between adjacent opposite magnetic poles.

Strip A includes a very thin and relatively wide central portion 14 having a mounting edge portion 16. Mounting edge portion 16 includes an outer terminal edge 18, and outer and inner plane surfaces 20 and 22.

A plurality or pair of mounting legs 26 and 28 extend outwardly from mounting edge portion inner surface 22. Mounting legs 26 and 28 extend the full length of strip A substantially perpendicular to surfaces 20 and 22. Mounting legs 26 and 28 extend substantially parallel to one another, and are spaced-apart in a direction transverse to longitudinal axis 12 and parallel to mounting edge portion outer surface 20. This provides an elongated generally rectangular mounting space or groove 30. Leg 26 has the outer surface thereof forming an extension of outer edge 18 on mounting edge portion 16.

If so desired, a mounting web portion 34 may extend integrally from mounting leg 28 over to another mounting leg 36 which would be spaced from leg 28 across a gap 38 in the same direction as legs 26 and 28 are spaced-apart. In any event, mounting edge portion 16, along with legs 26 and 28 defines a mounting portion having a generally U-shaped cross-sectional configuration. As shown by the dotted lines, additional connected legs may provide a plurality of interconnected and reversely positioned U-shaped mounting portions which add flexibility to strip A in a direction transverse to longitudinal axis 12. For example, gap 38 would be made smaller or larger by flexing of legs 28 and 36, and connecting web 34. However, it is possible to omit additional gaps as at 38 by providing a sufficient width and a very small thickness for central portion 14.

A longitudinal edge of strip A opposite from mounting edge portion 16 is provided with a pair of sealing and closure strip portions 40 and 42. Sealing and closure strip portions 40 and 42 have plane outer surfaces 44 and 46 extending generally parallel to the plane of central portion 14, and opposite inner surfaces 48 and 50. Sealing and closure strip portions 40 and 42 have outer surfaces 44 and 46 thereof spaced substantially outward from mounting edge portion outer surface 20. Outer surfaces 44 and 46 lie in a substantially common plane.

Sealing and closure strip portion 40 is connected with central portion 14 by a leg 54 which extends substantially perpendicular to central portion 14. An opposite leg 56 depends from the other edge of sealing and closure strip portion 40. Leg 56 is integrally connected by a web portion 58 with another leg 60 extending substantially parallel to legs 54 and 56. Leg 60 is integrally formed with sealing and closure strip portion 42, which has another leg 62 depending therefrom and extending substantially parallel to legs 54, 56 and 60. Legs 54 and 56 are spaced-apart across a gap 70 in a direction transverse to longitudinal axis 12 and substantially parallel to outer surface 44 of sealing and closure strip portion 40. Legs 56 and 60 are also spaced-apart in that same direction across gap 72. Legs 60 and 62 are also spaced-apart in that same direction across a gap 74.

Integral connecting web 58 is spaced a substantial distance below sealing and closure strip portions 40 and 42. In the preferred arrangement, web portion 58 has opposite surfaces lying in a common plane with the opposite surfaces of central portion 14. In addition, the preferred arrangement is to have all portions of strip A of a substantially uniform thickness. That is, the central portion, the mounting edge portion, the sealing and closure portions, and all of the legs have a substantially common thickness. This arrangement makes it easier to extrude strip A and insures optimum flexibility. However, it will be recognized that variations may be used.

The described sealing and closure strip portions present substantially U-shaped cross-sectional configurations extending outwardly from central portion 14 in an opposite direction from the generally U-shaped mounting edge portion. All of legs 54, 56, 60 and 56 may flex to vary the width of gaps 70, 72 and 74 for providing good flexibility transversely of longitudinal axis 12. In addition, sealing and closure strip portions 40 and 42, and connecting web portion 58, may flex to provide additional flexibility in the same direction. At the same time, the extreme thickness of the strip provides good flexibility at all portions so that longitudinal axis 12 may curve in any direction. That is, all portions of the strip have good flexibility perpendicular to a pair of opposed closing surfaces, and in a direction which extends parallel to the closing surfaces and perpendicular to longitudinal axis 12.

Each of sealing and closure portions 40 and 42 are magnetized to have magnetic poles of alternating polarity along outer surfaces 44 and 46 thereof. These poles are generally indicated by letters N and S in FIG. 1. Lines of magnetic force extending between adjacent opposite poles within strip A are generally indicated by dotted lines at 80. Legs 54, 56 60 and 62 provide a substantial thickness through which lines 80 of magnetic force may extend within strip A so that the bar length of the magnetic poles may be increased. Legs 54, 56 60 and 62 provide a substantial thickness of magnetic material through which lines of magnetic force 80 may extend between magnetic poles of opposite polarity, while maintaining high flexibility for strip A in all directions.

In accordance with one arrangement, sealing and closure strip portions 40 and 42 are magnetized so that magnetic poles of alternating polarity extend the full length thereof substantially parallel to longitudinal axis 12. Thus, lines of magnetic force 80 will extend between adjacent opposite poles within legs 54 and 56 for sealing and closure portion 40, and within legs 60 and 62 for sealing and closure portion 42. However, it will be recognized that other magnetization arrangements may be used. For example, the arrangement shown in FIG. 1 has poles of like polarity in sealing and closure portions 40 and 42 aligned transversely of longitudinal axis 12. However, it is possible to stagger the poles so that legs 56 and 58 would carry the lines of magnetic force through connecting web 58. Thus, it is possible that the lines of magnetic force 80 may extend arcuately through strip A generally parallel to longitudinal axis 12 or perpendicular thereto.

The described legs can be completely included in the magnetic circuit without the necessity of providing the entire strip of even the entire sealing and closure strip portion with a greater thickness. With the described legs, it is possible to provide a greater length for the magnetic lines of force so that the pole width can be increased in a direction parallel to longitudinal axis 12. The magnetic attractive force is thereby considerably increased. The enlargement of the pole width is possible because the magnetic lines of force can flow through the total thickness or height of the legs. With a leg thickness or height amounting to around 3 millimeters, each magnetic pole can have a width of 6 millimeters in a direction parallel to longitudinal axis 12. However, the total thickness of every portion of strip A amounts to only 1 millimeter. As previously explained, the maximum pole width in a completely flat strip having a thickness of only 1 millimeter would be 2 millimeters. Flat strip magnets having closely spaced poles of alternating polarity provide very low attractive force, and also involve difficulties in magnetizing and constructing the magnetizing device. The arrangement of the present invention makes it possible to provide substantially wider poles while maintaining high flexibility for the strip.

Mounting leg portions 26 and 28 make it possible to easily attach strip A to a closure panel or periphery of an opening, although it is possible to use clamping arrangements or adhesives if so desired. The integral mounting arrangement of the present invention allows strip A to be freely resilient in a direction perpendicular to the closing surfaces.

Figure 2:
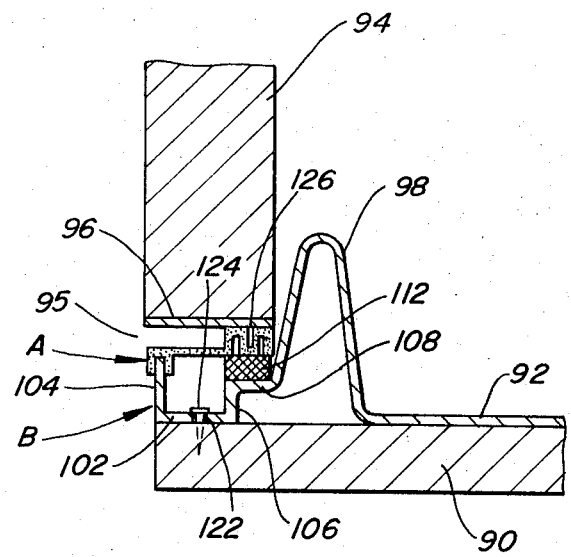
FIG. 2 is a cross-sectional plan view of the member of FIG. 1 mounted for sealing and closing between opposed closing surfaces on a closure panel and opening periphery.

One arrangement for mounting strip A is shown in FIG. 2. A closure panel defined by a hinged and swingable refrigerator door 90 has an inner casing 92 of plastic or fiberglass reinforced plastic secured to the inner surface thereof in a known manner to provide shelves or mounting recesses for any material to be cooled, such as eggs or bottles. One wall 94 of a refrigerator box defining a generally rectangular opening 95 is shown. One peripheral portion 96 of the rectangular periphery of the opening is shown in FIG. 2. Casing 92 has an upwardly formed portion as at 98 which projects into the opening. Casing 92 has a peripheral portion as at B which has a substantially rectangular cross-sectional configuration. Peripheral portion B includes a substantially flat base portion 102 integral with spaced-apart flange portions 104 and 106 extending substantially parallel to one another, and perpendicular to base portion 102. Flange 106 has a length substantially less than flange 104 and merges integrally with a short horizontal portion 108 extending parallel to base portion 102. Horizontal portion 108 merges into outwardly curved portion 98. Horizontal portion 108 merging into portion 98 provides a shoulder to which an elongated strip 112 of foam rubber or foam plastic is adhesively secured. It should be recognized that provision of foam strip 112 is not always absolutely necessary.

The terminal portion of flange 104 is tightly received between mounting legs 26 and 28 for mounting strip A onto inner casing 92. Obviously, adhesive may be applied to the inner surfaces of space 30 between legs 26 and 28 or onto the terminal portion of flange 104 for adhesively securing strip A onto flange 104. Preferably, the width of space 30 is somewhat less than the thickness of flange 104 so that legs 26 and 28 will flexibly and frictionally grip flange 104.

Base portion 102 on inner casing 92 may have a plurality of longitudinally spaced holes as at 122 therethrough for receiving screws or other fastening devices as at 124 which extend into door 90 for securing casing 92 thereto. Strip A is positioned so that it completely spans across flanges 104 and 106 to completely conceal fasteners 124. Strip A is dimensioned so that connecting web 58, the bottom of leg 62 and the bottom of leg 54 all contact foam strip 112. A flat strip 126 of soft iron or other material having a high magnetic permeability is secured to the periphery of the opening into the refrigerator. When door 90 is closed, magnetized sealing and closure portions 40 and 42 are adjacent to ferro-magnetic portion 126 around the periphery of the opening in the refrigerator. The high flexibility of strip A perpendicular to the inner surface of door 90, and surface 96 around the periphery of the refrigerator opening, allows strip A to conform with irregularities generally found along such refrigerator doors or frames. Therefore, an extremely good magnetic latching closure and atmosphere seal is provided between the door and the periphery of the opening without requiring additional resilient non-magnetic sealing strips.

Figure 3:
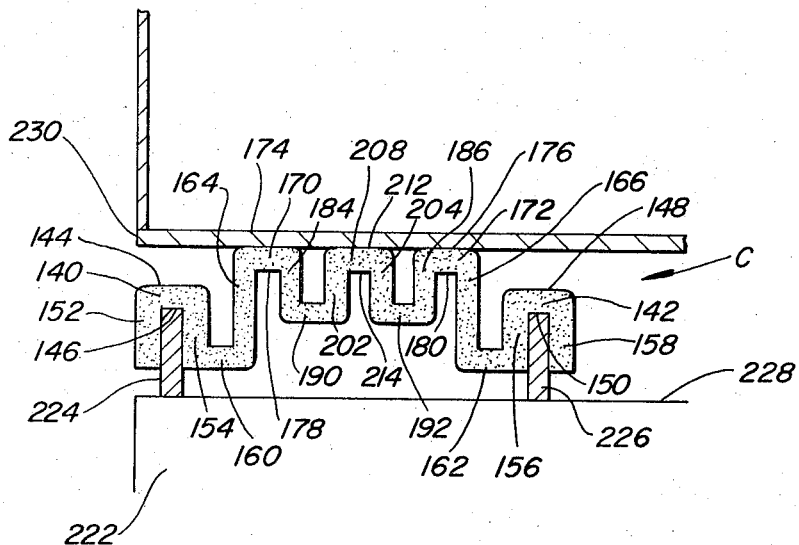
FIG. 3 is a cross-sectional plan view showing another embodiment of a permanent magnet sealing and closure member constructed in accordance with the present invention, and mounted for closing and sealing opposed closing surfaces on a closure panel and opening periphery.

FIG. 3 shows another magnetic strip C constructed in accordance with the present invention. Strip C has opposite mounting edge portions 140 and 142 which include outer and inner substantially plane surfaces 144, 146, 148 and 150. Mounting legs 152 and 154 extend outwardly from mounting edge portion 140, and mounting legs 156 and 158 extend outwardly from mounting edge portion 142. The described mounting legs are spaced-apart in a direction transversely to the longitudinal axis of strip C, and substantially parallel to outer surfaces 144 and 148. Legs 154 and 156 are integrally connected by legs 160 and 162 with longer legs 164 and 166. Legs 164 and 166 are also spaced-apart from legs 154 and 156 in the same direction as previously described for the spacing of legs 152 and 154. Legs 164 and 166 have a greater length than mounting legs 152, 154, 156 and 158. Legs 164 and 166 are integrally connected with sealing and closure portions 170 and 172 having substantially plane outer surfaces 174 and 176, and opposite inner surfaces 178 and 180. Sealing and closure portions 170 and 172 are integrally connected with legs 184 and 186 extending substantially perpendicular thereto, and spaced-apart from legs 164 and 166 in the same direction as previously described with respect to legs 152 and 154. Connecting webs 190 and 192 are spaced above connecting webs 160 and 162, and integrally connect legs 184 and 186 with legs 202 and 204. Legs 202 and 204 are spaced-apart in substantially the same direction as legs 152 and 154. Legs 202 and 204 are integrally connected with a sealing and closure portion 208 having an outer surface 212 lying in a substantially common plane with outer surfaces 174 and 176, and an opposite inner surface 214 from which legs 202 and 204 depend. All of the legs and connecting web portions in gasket C have substantially the same thickness. Therefore, strip C has a substantially uniform cross-sectional thickness in all portions thereof.

A refrigerator door 222 is provided with a pair of substantially parallel spaced-apart mounting flanges 224 and 226 suitably secured thereto and extending outwardly from inner surface 228 thereof. Mounting flanges 224 and 226 are respectively tightly received between legs 152 and 154, and legs 156 and 158. Obviously, adhesive may be used if so desired for additional securing. A ferro-magnetic frame portion 230 around the periphery of the refrigerator opening is adapted to be contacted by outer surfaces 174, 176 and 212 of sealing and closure portions 170, 172 and 208.

With the arrangement described, strip C has a generally accordion-like cross-sectional configuration providing high flexibility in all directions. That is, strip C has high flexibility along its length, and in a direction generally parallel to the closing surfaces and perpendicular to its longitudinal axis. Sealing and closure portions 170, 172 and 208 are magnetized in the same manner as described with respect to gasket A of FIG. 1. Therefore, legs 164, 184, 202, 204, 186 and 166 provide substantial thickness through which lines of magnetic force may extend parallel to the longitudinal axis of strip C so that the width or bar length of the alternating magnetic poles may be substantially greater than that possible with a flat strip. The arrangement described for strip C provides a plurality of inverted and interconnected sealing and closure portions having generally U-shaped cross-sectional cconfigurations. These merge into the mounting edge portions which also have generally U-shaped cross-sectional configurations.

The sealing and insulating effect is improved with the magnetic strip of the present invention because a plurality of spaced-apart parallel longitudinally extending sealing surfaces have air chambers defined by the gaps therebetween.

The magnetic sealing and closure device constructed in accordance with the present invention also makes it possible to provide extremely tight corner joints between adjacent or abutting ends.

Figure 4:
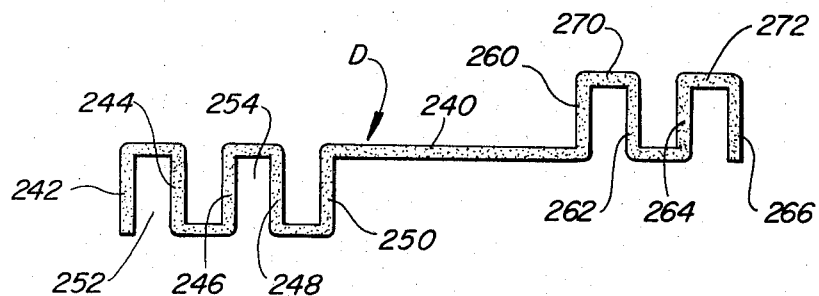
FIG. 4 is a cross-sectional view of another embodiment of the present invention.

FIG. 4 shows an elongated very thin permanent magnet strip D having a central portion 240. The spacing arrangements of the various legs and webs are the same as described with respect to preferred embodiments and will be only briefly identified. Strip D includes a mounting edge portion having spaced-apart substantially parallel mounting legs 242, 244, 246, 248 and 250. Mounting legs 242 and 244 have a mounting space 252 therebetween. Mounting legs 246 and 248 have a mounting space 254 therebetween. At the opposite longitudinal edge of strip D there are spaced-apart parallel legs 260, 262, 264 and 266 extending substantially perpendicular to central portion 240 and parallel to the mounting legs. Legs 260, 262, 264 and 266 are integrally connected with spaced-apart sealing and closure portions 270 and 272 having plane outer surfaces corresponding to the arrangement described with respect to FIG. 1.

Figure 5:
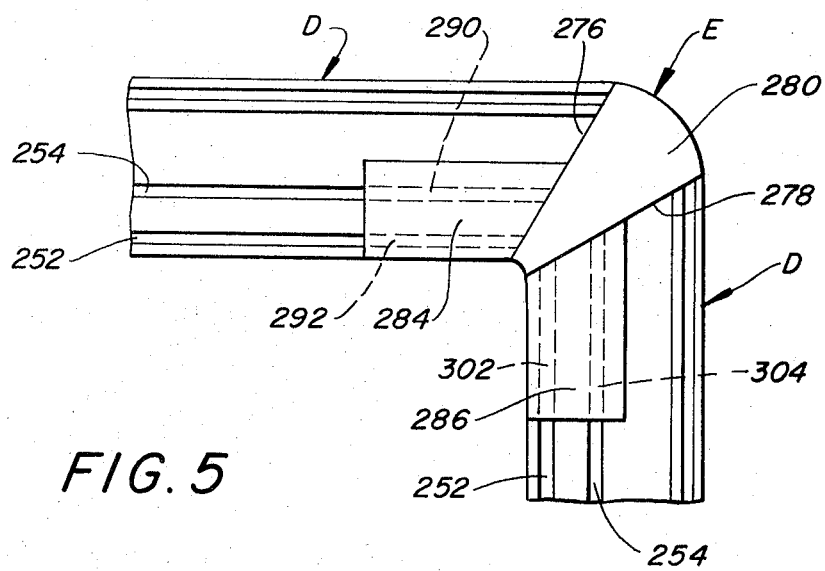
FIG. 5 is a front elevational view of a corner joint between abutting magnetic sealing and closure members.

FIG. 5 shows a pair of strips D positioned perpendicular to one another, and having adjacent edges 276 and 278. Instead of being cut at an angle of 45° to the longitudinal axes of strips D, edges 276 and 278 are cut at an angle of around 30° to the longitudinal axes of strips D. A connecting member E includes a central arcuate portion 280 having opposite edges mating with edges 276 and 278 of strips D. Connecting member E includes opposite connecting portions 284 and 286 extending substantially perpendicular to one another. Connecting portion 284 has elongated spaced-apart ribs as at 290 and 292 extending perpendicular thereto, and tightly received within spaces 252 and 254 of one gasket D. The other portion 286 of connecting member E has spaced-apart ribs as at 302 and 304 tightly received within spaces 252 and 254 of the other gasket D. Obviously, suitable adhesive may be provided on the adjacent surfaces of connecting member E and gaskets D.

Figure 6:
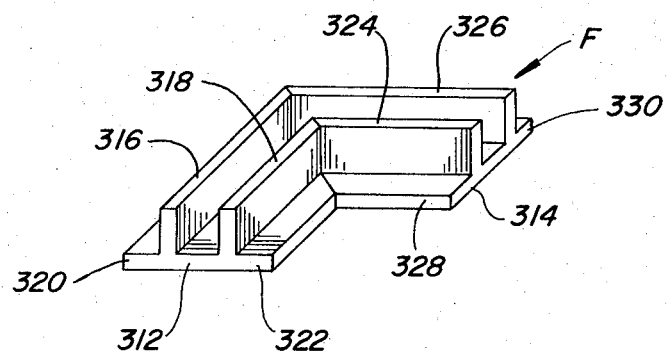
FIG. 6 is a perspective illustration of a connecting member used in the joint of FIG. 4; and, FIG. 7 is a rear elevational view showing a corner joint between abutting end portions of magnetic sealing and closure members.
Figure 7:
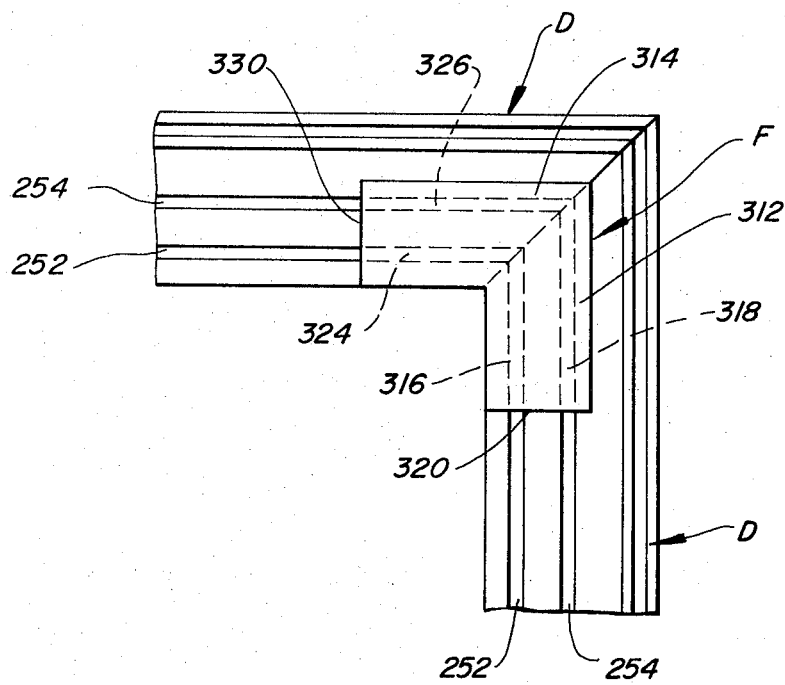

FIG. 6 shows a right-angle connecting member F having base portions 312 and 314 extending substantially perpendicular to one another. Base portion 312 has spaced-apart substantially parallel ribs 316 and 318 extending outwardly substantially perpendicular thereto, and spaced inwardly from opposite outer edges 320 and 322 thereof. Base portion 314 has spaced-apart substantially parallel legs 324 and 326 extending outwardly therefrom and spaced inwardly from opposite edges 328 and 330 of base portion 314. Legs 316 and 326 intersect one another, as do legs 318 and 324 at a substantially right angle corner. Connector member F of FIG. 6 is received in grooves or gaps 252 and 254 in adjacent ends of a pair of gaskets D as shown in FIG. 7. In this arrangement, strips D have their abutting end portions cut at substantially 45° angles for mating at a perpendicular corner joint. Obviously, suitable adhesive may be applied to mating surfaces of abutting end portions of gaskets D and to connector F. In the preferred arrangement, the ribs on the connecting members have a width or thickness slightly greater than the gap between adjacent mounting legs on the connecting portions of the strips. Therefore, the mounting legs of the strips tightly and frictionally grip the ribs. Obviously, mechanical fasteners or adhesive may be used for providing additional securement if so desired.

Legs 54, 56, 60 and 62 may have various heights. By way of example, where all portions of strip A have a thickness of 1 millimeter, the height of leg 54 between inner surface 48 and the outer surface of central portion 14 is around 2 millimeters. Thus, including the thickness of central portion 14 and sealing and closure portion 40, leg 54 has a height of around 4 millimeters. Legs 26, 28, 56, 60 and 62 are similarly dimensioned. The facing parallel inner surfaces of legs 54 and 56 are spaced-apart around 1 millimeter. The opposed surfaces of the other legs are similarly spaced, including the opposed surfaces of legs 56 and 60. Obviously, various other dimensions may be used for strip A. Strip C may be dimensioned similar to the dimensioning described for strip A.

Although the invention has been shown and described with respect to certain preferred embodiments, it is obvious that equivalent alterations and modifications will occur to others skilled in the art upon the reading and understanding of this specification. The present application includes all such equivalent alterations and modifications, and is limited only by the scope of the claims.

Having thus defined my invention, I claim:

1. A magnetic sealing and closure member comprising; an elongated strip of flexible permanent magnet material having a longitudinal axis, said strip in transverse cross section having a generally uniform thickness and including a plurality of transversely spaced portions, each having a substantially plane sealing surface, a plurality of legs extending generally perpendicularly away from each said surface and being spaced-apart in a direction transversely of said longitudinal axis means integrally joining the ends of said legs remote from said sealing portions, said sealing portions being magnetized to have alternating magnetic poles along said sealing surface so that magnetic lines of force extending between adjacent ones of said magnetic poles take arcuate courses within said legs, and a mounting edge portion integral with an end of a leg remote from its sealing portion and extending at an angle thereto.

2. The member of claim 1 wherein said mounting edge portion has surfaces spaced from the plane of said sealing surfaces.

3. The member of claim 2 wherein said edge portion has a plurality of parallel legs extending generally transversely away therefrom and being spaced-apart in a direction extending transversely of said longitudinal axis and substantially parallel to said edge portion.

4. The member of claim 2 wherein said strip has a pair of mounting edge portions, each integral with an end of a leg remote from said sealing portion and said sealing portion is positioned intermediate said edge portions.

5. The member of claim 4 wherein said mounting edge portions have a plurality of parallel legs extending away therefrom and being spaced-apart in a direction transversely of said longitudinal axis and substantially parallel to said edge portions to define a mounting flange receiving space.

6. The member of claim 1 wherein said strip has at least one mounting edge portion extending at an angle from the end of a leg remote from said portion and including mounting edge portion inner and outer surfaces, and a plurality of mounting legs extending outwardly from said mounting edge portion inner surface and being spaced-apart in a direction transversely of said longitudinal axis and parallel to said mounting edge portion inner surface.

7. The member of claim 6 and including a mounting member having an elongated flange portion tightly received between said mounting legs.

8. The member of claim 6 wherein said sealing portion is spaced outwardly from said mounting edge portion outer surface.

9. The member of claim 8 wherein there are a plurality of said sealing portions spaced-apart across a gap in a direction extending transversely of said longitudinal axis and substantially parallel to said sealing surfaces thereof.

10. The member of claim 9 wherein said legs include opposed legs on opposite sides of said gap, said opposed legs being integrally connected by a web portion spaced substantially away from said sealing portions.

11. The member of claim 9 wherein there are a pair of said strips having adjacent substantially abutting end portions, and a connecting member having a spaced-apart ribs extending outwardly therefrom and received between adjacent legs on said end portions for joining said end portions.

12. The member of claim 11 and further including a substantially rectangular inside casing panel mountable to an inside surface of a closure panel, said casing panel having a casing periphery including flange means extending outwardly therefrom, said flange means being tightly received between adjacent ones of said mounting legs for clamping said strip to said inside casing panel.

13. A magnetic sealing and closure member comprising: an elongated thin flexible strip of permanent magnet material having a strip longitudinal axis, said strip including at least one sealing and closure strip portion and at least a mounting edge portion, said sealing and closure strip portion having a substantially plane outer surface and an inner surface, a plurality of legs extending away from said inner surface and being spaced-apart in a direction transversely of said longitudinal axis and substantially parallel to said outer surface, said legs having strip connecting ends and opposite ends, at least certain of said opposite ends being integrally connected by a connecting web so that said strip in the area of said legs has a cross-sectional configuration defined by interconnected and reversely positioned substantially U-shaped portions, said sealing and closure strip portion being magnetized to have magnetic poles of alternating polarity extending along said outer surface so that magnetic lines of force extending between adjacent ones of said magnetic poles within said strip take arcuate courses within said legs.

* * * * *